United States Patent [19]
Konigsburg et al.

[11] Patent Number: 6,021,467
[45] Date of Patent: Feb. 1, 2000

[54] APPARATUS AND METHOD FOR PROCESSING MULTIPLE CACHE MISSES TO A SINGLE CACHE LINE

[75] Inventors: Brian R. Konigsburg; John Stephen Muhich; Larry Edward Thatcher; Steven Wayne White, all of Austin, Tex.

[73] Assignee: International Business Machines Corporation, Armonk, N.Y.

[21] Appl. No.: 08/713,056

[22] Filed: Sep. 12, 1996

[51] Int. Cl.[7] .................................................. G06F 12/08
[52] U.S. Cl. ........................................ 711/122; 711/138
[58] Field of Search ........................... 711/3, 119, 122, 711/138

[56] References Cited

U.S. PATENT DOCUMENTS

| | | | |
|---|---|---|---|
| 5,285,323 | 2/1994 | Hetherington et al. | 711/122 |
| 5,317,718 | 5/1994 | Jouppi | 711/122 |
| 5,644,752 | 7/1997 | Cohen et al. | 711/122 |
| 5,649,154 | 7/1997 | Kumar et al. | 711/122 |
| 5,671,444 | 9/1997 | Akkary et al. | 711/122 |
| 5,740,399 | 4/1998 | Mayfield et al. | 711/122 |

*Primary Examiner*—Eddie P. Chan
*Assistant Examiner*—Gary J. Portka
*Attorney, Agent, or Firm*—Anthony V.S. England; Andrew J. Dillon

[57] ABSTRACT

An apparatus and method for processing multiple cache misses to a single cache line in an information handling system which includes a miss queue for storing requests for data not located in a level one cache and a comparator for comparing requests for data stored in the miss queue to determine if there are multiple requests for data located in the same cache line of a level two cache. Each new request for data from the same cache line of the level two cache as an older original request for data in the miss queue is marked as a load hit reload. The requests marked as load hit reloads are then grouped together with the matching original request and forwarded to the level two cache wherein the original request requests the data from level two cache. The load hit reload requests do not access level two cache but instead bypass access of level two cache by extracting data from the cache line outputted from level two cache for the matching original request. The present invention reduces the number of accesses to the level two cache and allows data requests to be satisfied in parallel versus serially when multiple successive level one cache misses occur.

16 Claims, 3 Drawing Sheets

APPARATUS AND METHOD FOR PROCESSING MULTIPLE CACHE MISSES TO A SINGLE CACHE LINE

TECHNICAL FIELD OF THE INVENTION

The present invention relates to information handling systems and methods for operating information handling systems and, more particularly, to apparatuses and methods for processing multiple cache misses to a single cache line.

BACKGROUND OF THE INVENTION

A typical information handling system is depicted in FIG. 1 and includes at least one central processing unit (CPU) 10 with one or more integrated data transfer units 11, one or more levels of cache memory 13, and a number of other units such as one or more execution units (not shown) or a memory management unit (not shown). CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the information handling system to a data processing network, and display adapter 36 for connecting bus 12 to display device 38.

Cache memory 13 is one part of the overall concept of storage hierarchies where faster but less dense memories are placed closer to CPU 10, and slower but more dense or bigger memories back them up. Cache memory 13 may have one or more levels of storage hierarchy wherein the most frequently requested data by CPU 10 is stored in a first level of cache memory, the next most frequently requested data is stored in a second level of cache memory and the least frequently requested data is stored in a main memory such as RAM 14 or ROM 16 located outside of CPU 10. When CPU 10 needs to make a request for data from memory, data transfer units 11 search cache memory 13 for the address of the desired data. If the data is available a hit occurs and the data is transferred. If the data is not in cache memory 13, then a miss or cache fault occurs. If cache memory 13 has multiple levels each level is searched one at a time until a hit occurs.

Referring now to FIG. 2, a portion of a state of the art central processing unit (CPU) 100 is depicted. Reference numerals used in FIG. 2 which are like or similar to the reference numerals used in FIG. 1 are intended to indicate like or similar components. CPU 100 includes data transfer units 111a, 111b, a level one cache 113a, and a level two cache 113b. Data transfer units 111a and 111b are operably associated with level one cache 113a for transferring data within CPU 100. Data transfer units 111a, 111b include circuitry for requesting data to be transferred by data transfer units 111a, 111b from level one cache 113a. Data transfer units 111a, 111b are preferably load units; however, data transfer units 111a, 111b may be load/store units or store units. Level one cache 113a stores a first set of data for use by CPU 100, and level two cache 113b stores a second set of data for use by CPU 100. Level ore cache 113a and level two cache 113b include addressable memory locations or cache lines such that data is stored in a memory location or a cache line within level one cache 113a and level 2 cache 113b having a unique address. CPU 100 further includes miss queues 150a, 150b. Miss queue 150a is operably coupled to data transfer unit 111a, and miss queue 150b is operably coupled to data transfer unit 111b. Miss queues 150a, 150b are also operably coupled to level two cache 113b.

CPU 100 further includes a data output port 152a operably associated with data transfer unit 111a and data output port 152b operably associated with data transfer unit 111b. Data output port 152a outputs data to be transferred by data transfer unit 111a from level one cache 113a when the data requested by data transfer unit 111a is located in level one cache 113a. In a like manner, data output port 152b outputs data to be transferred by data transfer unit 111b from level one cache 113a when the data requested by data transfer unit 111b is located in level one cache 113a. Data output ports 152a, 152b may be connected to other units within CPU 100, such as general purpose registers (GPRs), for transferring the data to the other units. CPU 100 further includes a data formatter or rotater 154a operably associated with data output port 152a and data transfer unit 111a for formatting the data prior to transfer by data transfer unit 111a. A data formatter or rotater 154b is operably associated with data output port 152b and data transfer unit 111b for formatting the data prior to transfer by the data transfer unit 111b. Whereas, the data transferred by data transfer units 111a or 111b from level one cache 113a is an entire cache line, the data outputted through data output ports 152a or 152b is a specific operand or operands from a cache line extracted by data formatters 154a or 154b. In other words, data formatters 154a or 154b are hardware mechanisms used to extract a desired set of data bytes from a potentially larger set of data bytes, such as are found in a cache line.

CPU 100 further includes a data output port 156 operably associated with level two cache 113b for outputting data to be transferred by one of data transfer units 111a, 111b from level two cache 113b when the data requested by one of the data transfer units 111a, 111b is located in level two cache 113b. Level two cache 113b outputs data through a level two cache output 157. Level two cache 113b outputs an entire cache line of data. A data formatter or rotater 158 is operably associated with data output port 156 and output 157 of level two cache 113b for formatting the data prior to outputting the data through data output port 156. Data formatter 158 extracts the specific data needed from the cache line outputted by level two cache 113b for forwarding to other units in CPU 100 via data output port 156. The data is outputted from level two cache 113b and data output port 156 without further interaction with data transfer units 111a, 111b. CPU 100 includes a reload latch 160 operably coupled to level one cache 113a and level two cache 113b for storing entire cache lines of data outputted from level two cache 113b so that such data can be transferred by a data bus 164 and stored in level one cache 113a to thereby update level one cache 113a to avoid subsequent cache misses.

In operation, when multiple operations or requests for data from data transfer units 111a, 111b to a single cache line in level one cache 113a miss the cache, or in other words, the address for the data is not found in level one cache 113a, the requests for such data are sent to the next hierarchical memory level, level two cache 113b, of CPU 100. Requests for data from data transfer units 111a, 111b wherein the data was not located in level one cache 113a are stored in miss queues 150a, 150b. Requests for data stored in miss queues 150a, 150b are forwarded to level two cache 113b one at a time, wherein the requested data address is searched for to determine whether level two cache 113b contains such address, thus producing a hit which can be forwarded to rotater 158 and outputted through data output port 156. If there are successive requests for data in the same memory location or cache line of level two cache 113b, delays in returning data to the remaining units of CPU 100 via data output ports 152a, 152b, or 156 occur when the data is not located in level one cache 113a, and thus, multiple cache misses occur. A bottleneck occurs when multiple cache misses to a single cache line in level one cache 113a occur before level one cache 113a receives a copy of the data from level two cache 113b or from other lower hierarchical memory levels. Multiple requests for the same address of data in a single cache line may occur if a "do" loop is used. Each request for the same address of data stored in miss queues 150a, 150b must access the data from level two cache 113b, assuming the data is located in level two cache 113b, and output the data via data output port 156 for each request one at a time.

What is needed is an apparatus and method for recognizing that multiple requests for the same cache line are stored in the miss queue such that only one access to the level two cache is needed to retrieve the data and such that the data can be outputted and forwarded to other units of the CPU in parallel or more than one at a time.

SUMMARY OF THE INVENTION

Accordingly, the present invention is directed to a central processing unit (CPU) for an information handling system comprising: a level one cache for storing a first set of data for use by the CPU; a level two cache for storing a second set of data for use by the CPU, wherein the level two cache includes a level two cache output for outputting cache lines of data; at least one data transfer unit operably associated with said level one cache for transferring data within the CPU, wherein each of the data transfer units include request circuitry for requesting the data to be transferred from the level one cache; a miss queue operably coupled to the data transfer unit and to the level two cache for storing requests for data from the data transfer unit in which the data was not located in the level one cache and for forwarding the requests stored in the miss queue to the level two cache; a first output port operably associated with the data transfer unit for outputting data to be transferred by the data transfer unit from the level one cache when the data requested by the data transfer unit is located in the level one cache; and level two cache access bypass for providing cache line data from level two cache output to the first output port when multiple requests, by the request circuitry, for data located in the same cache line of the level two cache are stored in the miss queue.

The present invention also includes, a method for processing multiple cache misses to a single cache line in an information handling system, including a level one cache having multiple cache lines, a level two cache having multiple cache lines and a level two cache output for outputting cache lines, at least one data transfer unit, a miss queue operably coupled to the data transfer unit, a first output operably associated with the data transfer unit, the method comprising the steps of: storing a first set of data in the cache lines of level one cache; storing a second set of data in the cache lines of level two cache; requesting, by the data transfer unit, data to be transferred from the level one cache; storing requests for data not located in the level one cache in the miss queue; outputting data from the level one cache through the first output for requests for data located in the level one cache; and providing a cache line of data outputted from level two cache output to the first output when multiple requests for data located in the same cache line of the level two cache are stored in the miss queue.

The primary advantage of the present invention is that it improves processor performance by decreasing the time in which it takes to return data from memory to the remaining units of the processor when multiple misses to the same cache line occur.

Another advantage of the present invention is that it reduces energy consumption as compared to prior art processors, since the number of accesses to the level two cache is decreased.

DETAILED DESCRIPTION OF A PREFERRED EMBODIMENT OF THE INVENTION

Figure 1:
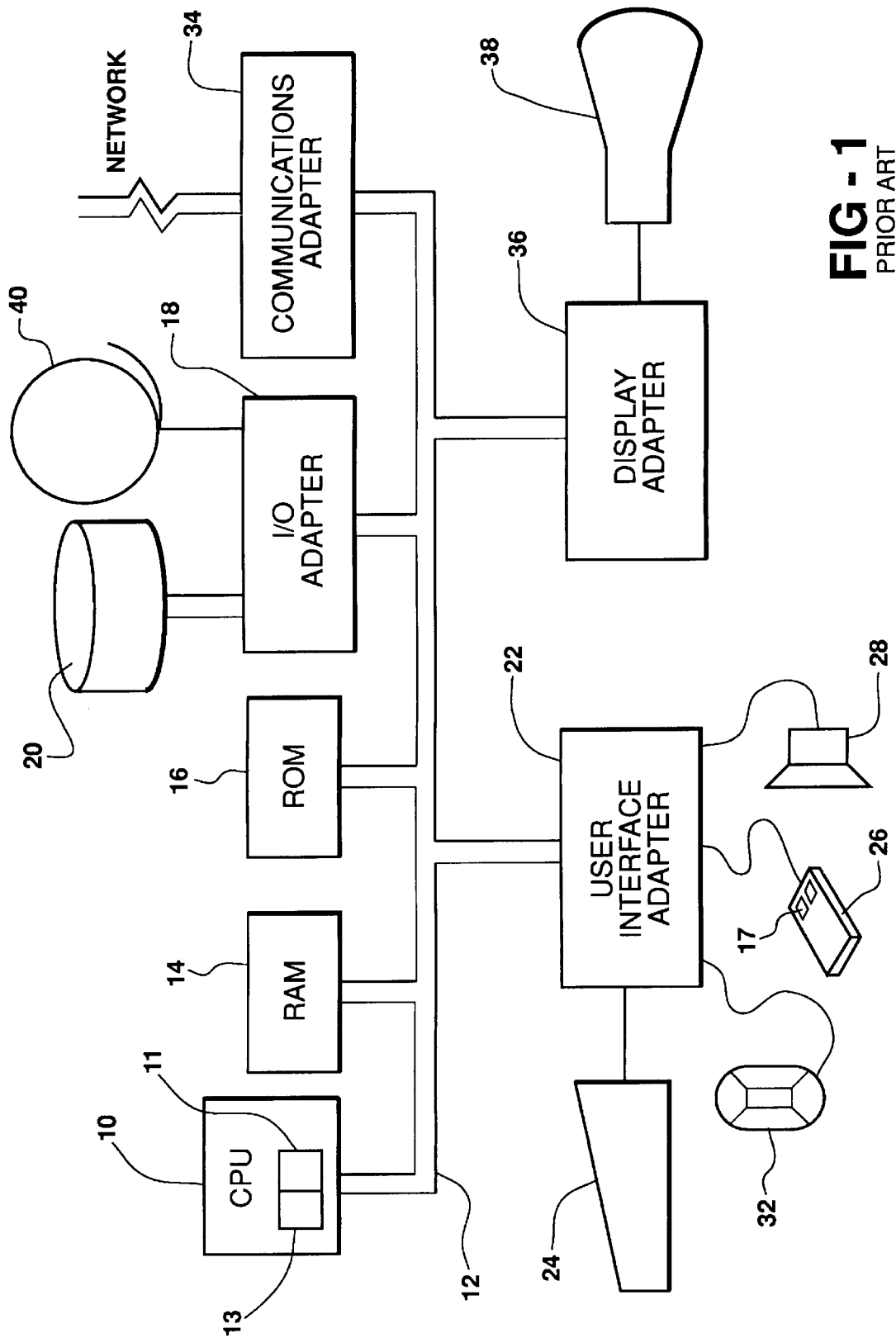
FIG. 1 is an information handling system embodying the present invention.

A representative hardware environment for practicing the present invention is depicted in FIG. 1, which illustrates a typical hardware configuration of an information handling system in accordance with the subject invention as has already been described above.

Figure 2:
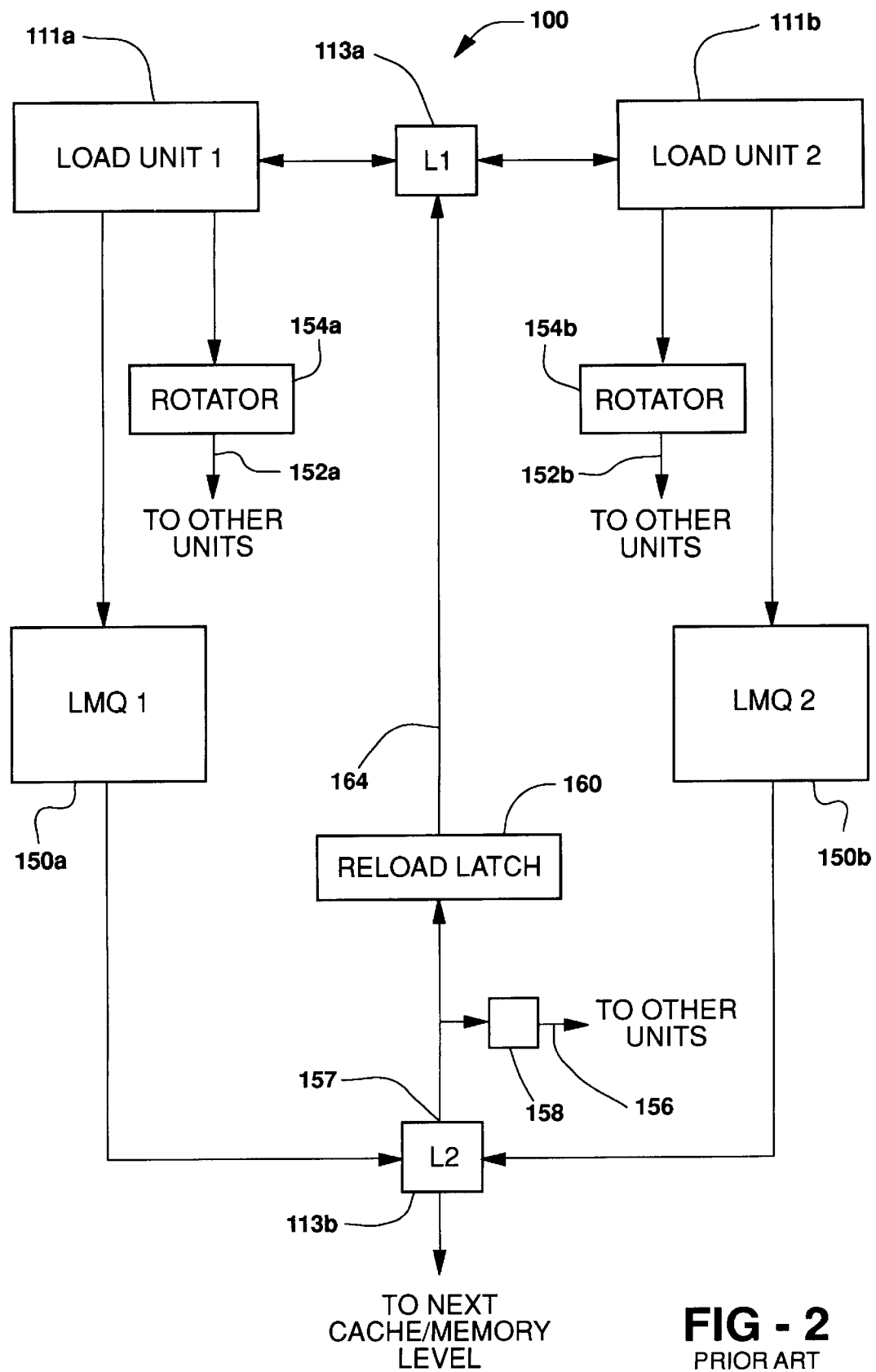
FIG. 2 is a block diagram of a portion of a prior art central processing unit.
Figure 3:
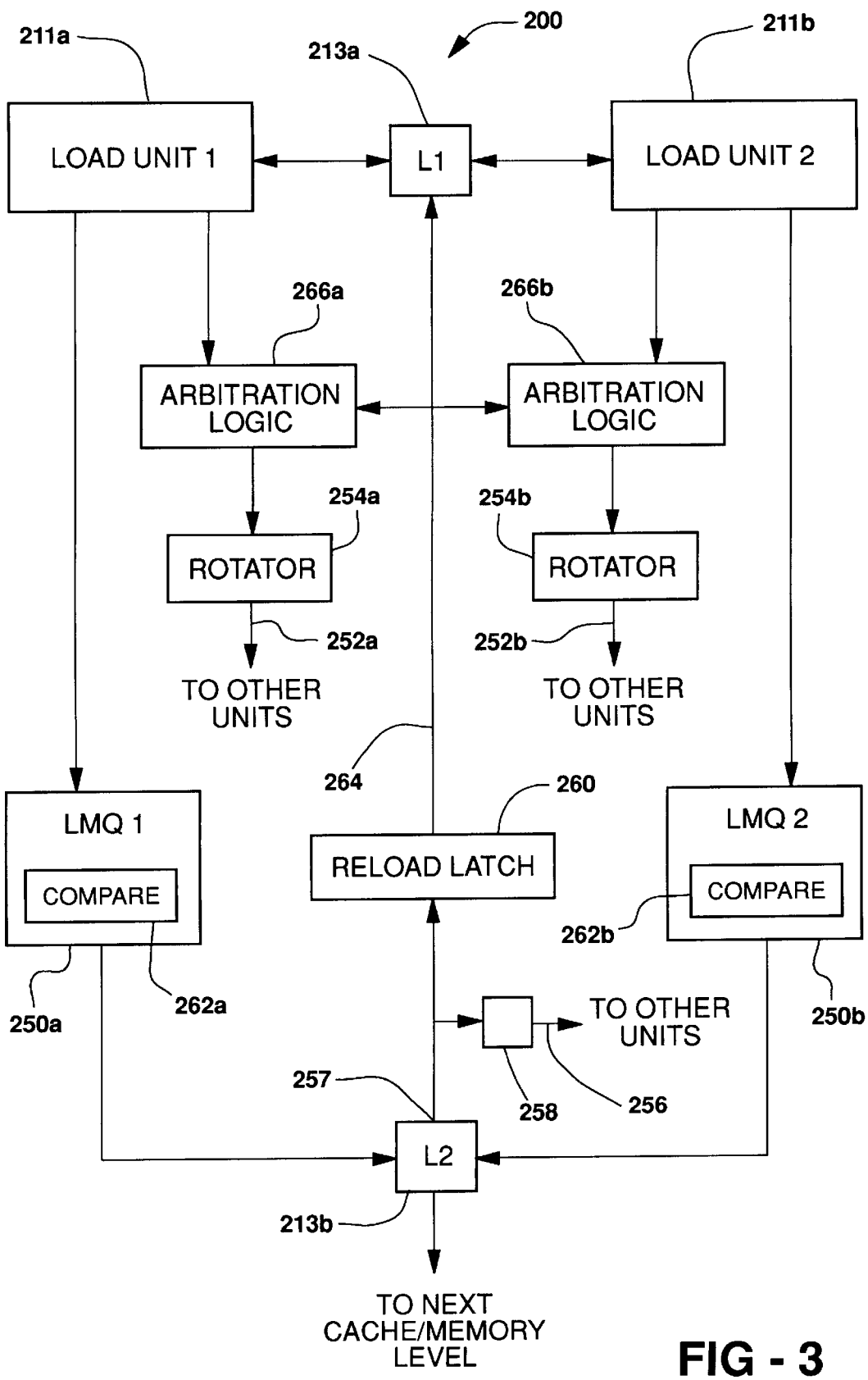
FIG. 3 is a block diagram of a portion of a CPU according to the present invention.

Referring now to FIG. 3, a central processing unit (CPU) 200 for an information handling system in accordance with the present invention will be described. The reference numerals used in FIG. 3 which are like or similar to the reference numerals used in FIG. 2 are intended to indicate like or similar components according to the present invention. It is to be understood that the word "data" as used in the description of the present invention means any information and may include instructions or data.

Comparator logic 262a is operably associated with miss queue 250a for comparing requests stored in miss queue 250a to determine if there are multiple requests for data located in the same memory location or, more specifically, the same cache line of level two cache 213b. In other words, comparator logic 262a searches for requests for data having the same address. Since it was already determined that this address was not located in level one cache 213a, the address may be found in level two cache 213b or lower hierarchical memory levels. In a similar fashion, comparator logic 262b is operably associated with miss queue 250b for comparing requests stored in miss queue 250b to determine if there are multiple requests for data located in the same cache line of level two cache 213b. In the preferred embodiment, comparator logic 262a and comparator logic 262b compare requests stored in both miss queues 250a, 250b at the same time to determine if there are multiple requests for data located in the same cache line of level two cache 213b. Thus, it is possible that data transfer unit 211a and data transfer unit 211b request data from the same cache line at the same time. The requests for such data are stored in miss queues 250a and 250b if the data is not found in level one cache 213a. In operation comparator logic 262a, 262b compares each new or original request stored in miss queues 250a, 250b with each subsequent request stored in miss queues 250a, 250b. If any subsequent requests match the original requests, then the subsequent requests are marked as "load hit reloads." The requests marked as load hit reloads are then grouped together with the matching original request and pipelined through level two cache 213b at the same time, wherein the original requests, that is, those requests not labeled with a load hit reload, request the data from the level two cache 213b as in the prior art. The load hit reload requests do not read data from or access level two cache 213b but instead bypass access of level two cache 213b. If an original request determines that the data is, in fact, stored in level two cache 213b, the data is forwarded via level two cache output 257 to both the reload latch 260 and rotater 258.

According to the present invention, reload latch 260 is operably coupled to data output port 252a and data output port 252b such that the entire cache line containing the data outputted from data output port 256 corresponding to the original request is provided or forwarded through data formatters 254a, 254b for corresponding requests marked as load hit reloads. Data bus 264 couples reload latch 260 to level one cache 213a so that data from a cache line in level two cache 213b can be written to level one cache 213a as in FIG. 2. However, unlike FIG. 2, bus 264 also couples reload latch 260 to data output ports 252a and 252b via data formatters 254a and 254b. Specifically, bus 264 is routed to arbitration logic 266a and arbitration logic 266b. Arbitration logic 266a is operably coupled to data transfer unit 211a and rotater 254a for selecting data from one of level one cache 213a or level two cache 213b to be outputted from data output port 252a when data requested from level one cache 213a and data requested from level two cache 213b from data transfer unit 211a and bus 264, respectively, arrive simultaneously at arbitration logic 266a for output through data output port 252a. In a similar manner, arbitration logic 266b is operably coupled to data transfer unit 211b and rotater 254b for selecting data from level one cache 213a or from level two cache 213b to be outputted from data output port 252b when data requested from the level one cache 213a and data requested from level two cache 213b from data transfer unit 211b and bus 264, respectively, arrive simultaneously at arbitration logic 266b for output through data output port 252b. In other words, data transfer units 211a and 211b may be processing a new request for data which is located in level one cache 213a, and thus, a hit occurs requiring the data to be outputted via data output ports 252a or 252b. However, at the same time, a request marked as a load hit reload may also need to output data via data output ports 252a or 252b. Arbitration logic 266a and 266b controls the selection of which data is outputted first through data output ports 252a and 252b in such situations.

The present invention also includes a method for processing multiple cache misses to a single cache line in an information handling system including a level one cache having multiple cache lines, a level two cache having multiple cache lines and a level two cache output for outputting cache lines, at least one data transfer unit, a miss queue operably coupled to each data transfer unit, a first output operably associated with each data transfer unit, and a second output operably associated with the level two cache. The method comprises the steps of storing a first set of data in the cache lines of the level one cache; storing a second set of data in the cache lines of the level two cache; requesting, by one or more of the data transfer units, data to be transferred from the level one cache; storing requests for data not located in the level one cache in the miss queue associated with the data transfer unit requesting such data; and outputting data from the level one cache through the first output for requests for data located in the level one cache. The method further includes the steps of outputting data from a cache line outputted through the level two cache output for requests for data located in level two cache and sending or providing a cache line of data outputted from the level two cache output to each first output when multiple requests for data located in the same cache line of the level two cache are stored in at least one of the miss queues. The method further includes comparing requests for data stored in each miss queue to determine if there are multiple requests for data located in the same cache line of the level two cache and bypassing access to data in the level two cache for each subsequent request in each miss queue, for data located in the same cache line of the level two cache. The method of the present invention further includes the step of selecting data from one of the level one cache or the level two cache to be outputted from the first output when data requested from the level one cache and data requested from the level two cache arrive simultaneously for output.

It is to be understood that many of the components shown in FIG. 3 may be combined within the scope of the present invention. For example, miss queues 250a, 250b could be combined to form one common miss queue, data transfer units 211a, 211b could be combined to form one common data transfer unit, level one cache 213a and level two cache 213b could be combined into a single memory unit which is then segmented to form two or more memory hierarchies, or arbitration logic 266a and 266b could be combined into a single arbitration logic unit.

Although the present invention and its advantages have been described in detail, it should be understood that various changes, substitutions and alterations can be made herein without departing from the spirit or scope of the invention as defined in the appended claims.

What is claimed is:

1. A central processing unit (CPU) for an information handling system, said CPU comprising:

a level one cache for storing a first set of data for use by said CPU;

a level two cache for storing a second set of data for use by said CPU wherein the level two cache includes a level two cache output for outputting cache lines of data;

at least one data transfer unit operably associated with said level one cache for transferring data within said CPU, said data transfer unit including request means for requesting data to be transferred from said level one cache;

miss queue means operably coupled to said data transfer unit and to said level two cache for storing every request for data from said request means in which the data was not located in said level one cache and for forwarding requests stored in said miss queue means to said level two cache;

first output means operably associated with said transfer unit for outputting data to be transferred by said transfer unit from said level one cache when the data requested by said request means is located in said level one cache; and level two cache access bypass means for providing a single cache line of data from said level two cache output to said first output means in response to multiple requests stored in said miss queue, which have been grouped together into a single request by said level two cache access bypass means, such that multiple accesses of said level two cache for instances of data located in the same cache line are avoided.

2. The CPU as recited in claim 1, wherein said level two cache access bypass means includes comparator means for comparing requests stored in said miss queue means to determine if there are multiple requests for data located in the same cache line of said level two cache.

3. The CPU as recited in claim 2, wherein said level two cache access bypass means further includes bus means for bypassing access to data in said level two cache for each subsequent request, in said miss queue means, for multiple instances of data located in the same cache line of said level two cache as an original request for data.

4. The CPU as recited in claim 3, wherein said bus means includes means for coupling said level two cache output to said first output means.

5. The CPU as recited in claim 4, further including arbitration means operably associated with said data transfer unit, said bus means, and said first output means for selecting data from one of said level one cache or said level two cache to be outputted from said first output means when data requested from said level one cache and data requested from said level two cache arrive simultaneously for output through said first output means.

6. The CPU as recited in claim 5, wherein said first output means includes data format means for formatting data outputted from said level one cache.

7. The CPU as recited in claim 6, further comprising second output means for outputting data from a cache line of data outputted from said level two cache output when the data requested by said request means is located in said level two cache, said second output means including data format means for formatting the data outputted from said level two cache output.

8. The CPU as recited in claim 7, wherein said data transfer unit is a load unit.

9. The CPU as recited in claim 7, wherein said data transfer unit is a load/store unit.

10. The CPU as recited in claim 7, wherein said bus means includes means for coupling said level two cache output to said level one cache so that data in said level two cache can be transferred to said level one cache when a request for the data was stored in said miss queue means.

11. The CPU as recited in claim 7 wherein said bus means includes a reload latch for storing the data outputted from said level two cache output.

12. A method for processing multiple cache misses to a single cache line in an information handling system, including a level one cache having multiple cache lines, a level two cache having multiple cache lines and a level two cache output for outputting cache lines, at least one data transfer unit, a miss queue operably coupled to the data transfer unit, and a first output operably associated with the data transfer unit, said method comprising the steps of:

storing a first set of data in the cache lines of level one cache;

storing a second set of data in the cache lines of level two cache;

requesting, by the data transfer unit, data to be transferred from the level one cache;

storing every request for data not located in the level one cache in the miss queue;

grouping together into a single request multiple requests for data located in the same cache line;

outputting data from the level one cache through the first output for requests for data located in the level one cache; and providing a single cache line of data outputted from said level two cache output to the first output in response to multiple requests stored in the miss queue which have been grouped together into a single request, so as to reduce the number of cache accesses needed for instances of data located in the same cache line.

13. The method as recited in claim 12, further comprising the step of comparing requests for data stored in the miss queue to determine if there are multiple requests for data located in the same cache line of the level two cache.

14. The method as recited in claim 13, further comprising the step of bypassing access to data in the level two cache for each subsequent request, in the miss queue, for instances of data located in the same cache line of the level two cache as an original request for the data.

15. The method as recited in claim 14, further comprising the step of selecting data from one of level one cache or the level two cache to be outputted from the first output when data requested from the level one cache and data requested from the level two cache arrive simultaneously for output.

16. The method as recited in claim 12, further comprising the step of outputting data from the level two cache output through a second output operably associated with the level two cache for requests for data located in the level two cache.

* * * * *